Figure 1:
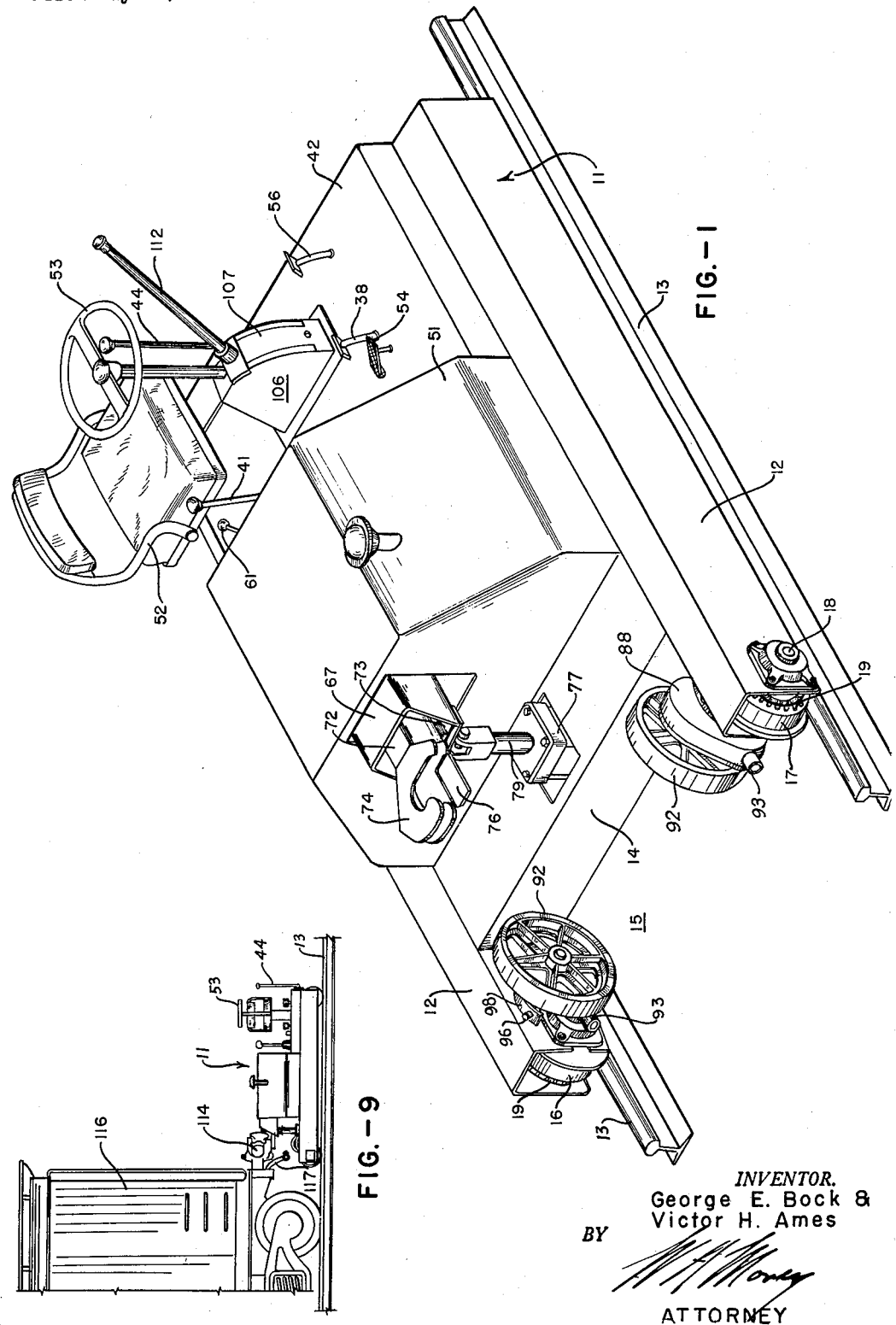

Sept. 20, 1955 G. E. BOCK ET AL 2,718,195
TRACTION VEHICLE
Filed May 25, 1950 7 Sheets-Sheet 1

INVENTOR.
George E. Bock &
Victor H. Ames
BY
ATTORNEY

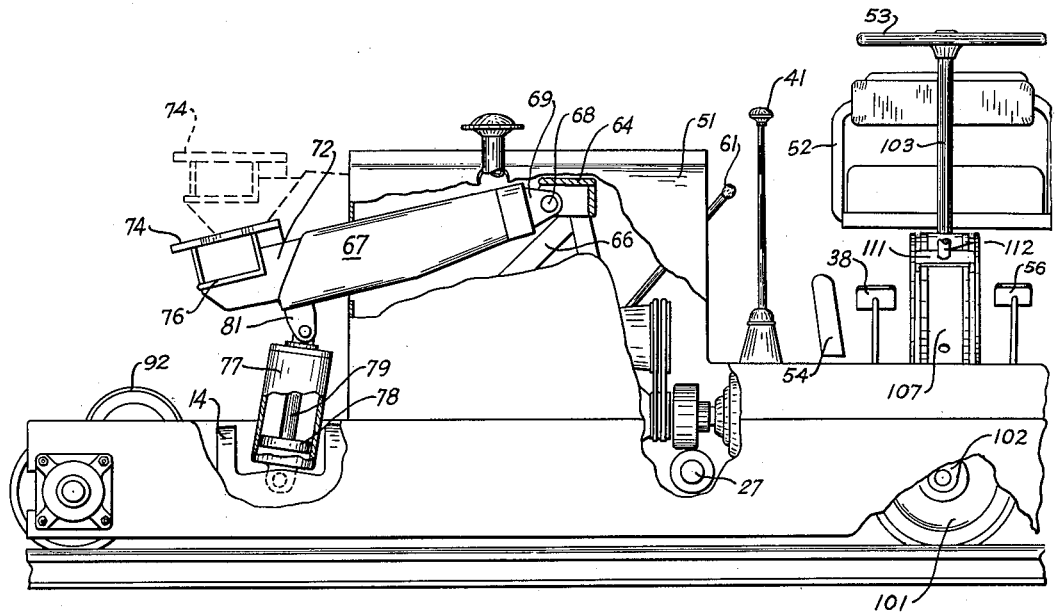
FIG.-2
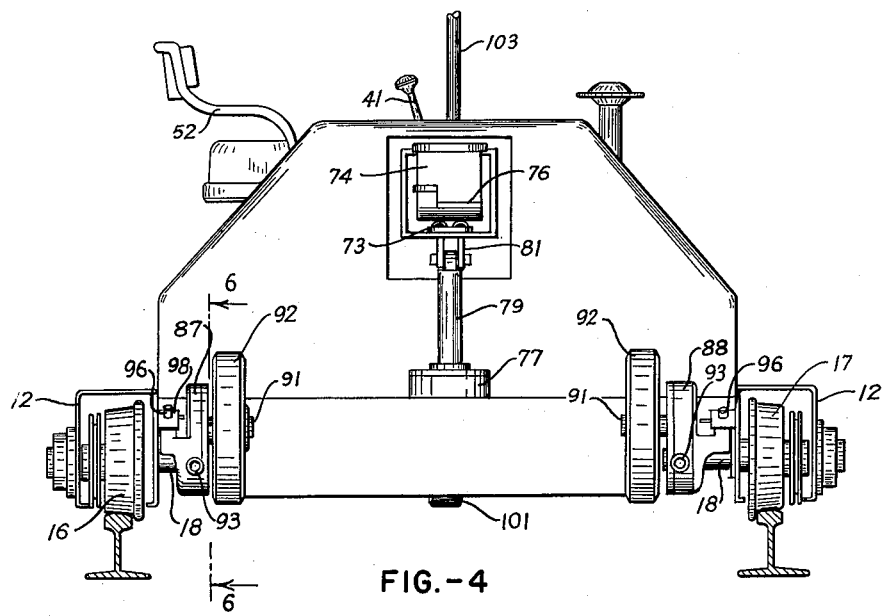
FIG.-4
*INVENTOR.*
George E. Bock &
Victor H. Ames
BY
ATTORNEY Sept. 20, 1955  G. E. BOCK ET AL  2,718,195
TRACTION VEHICLE
Filed May 25, 1950  7 Sheets-Sheet 3

INVENTOR.
George E. Bock &
Victor H. Ames
BY
ATTORNEY

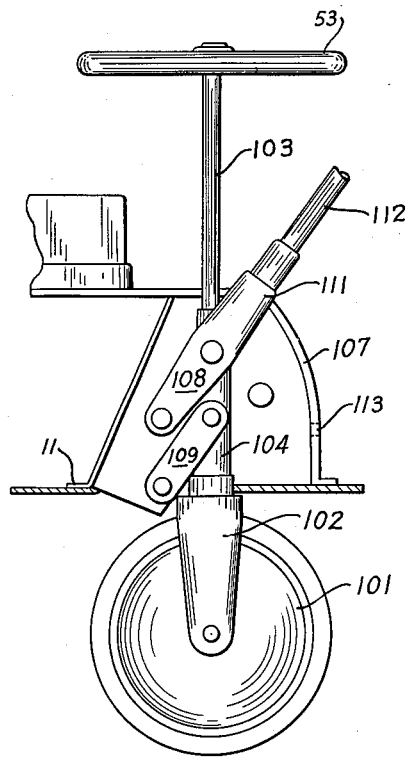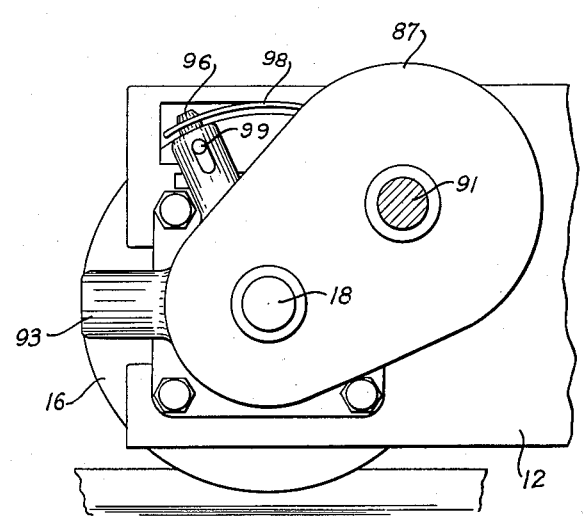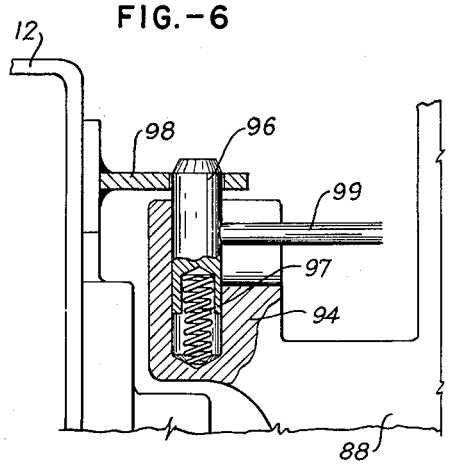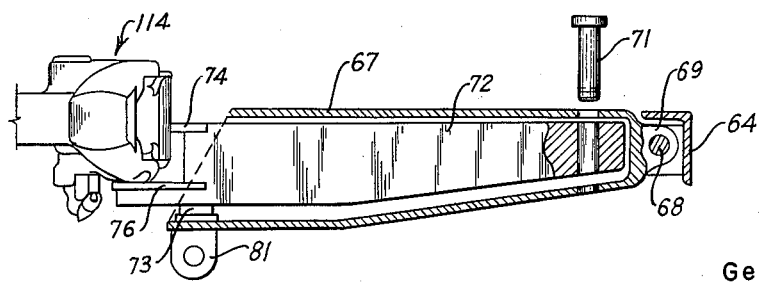

Sept. 20, 1955   G. E. BOCK ET AL   2,718,195
TRACTION VEHICLE
Filed May 25, 1950   7 Sheets-Sheet 5
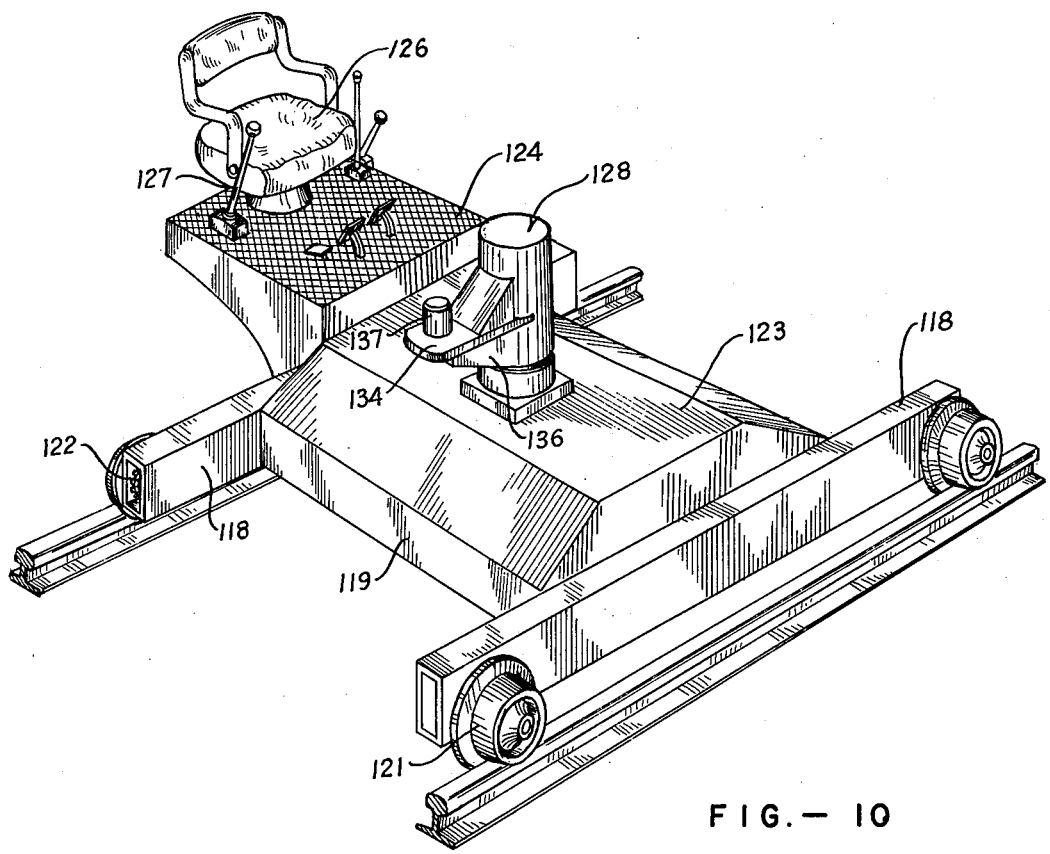
FIG.— 10
*INVENTOR.*
George E. Bock &
BY   Victor H. Ames
ATTORNEY

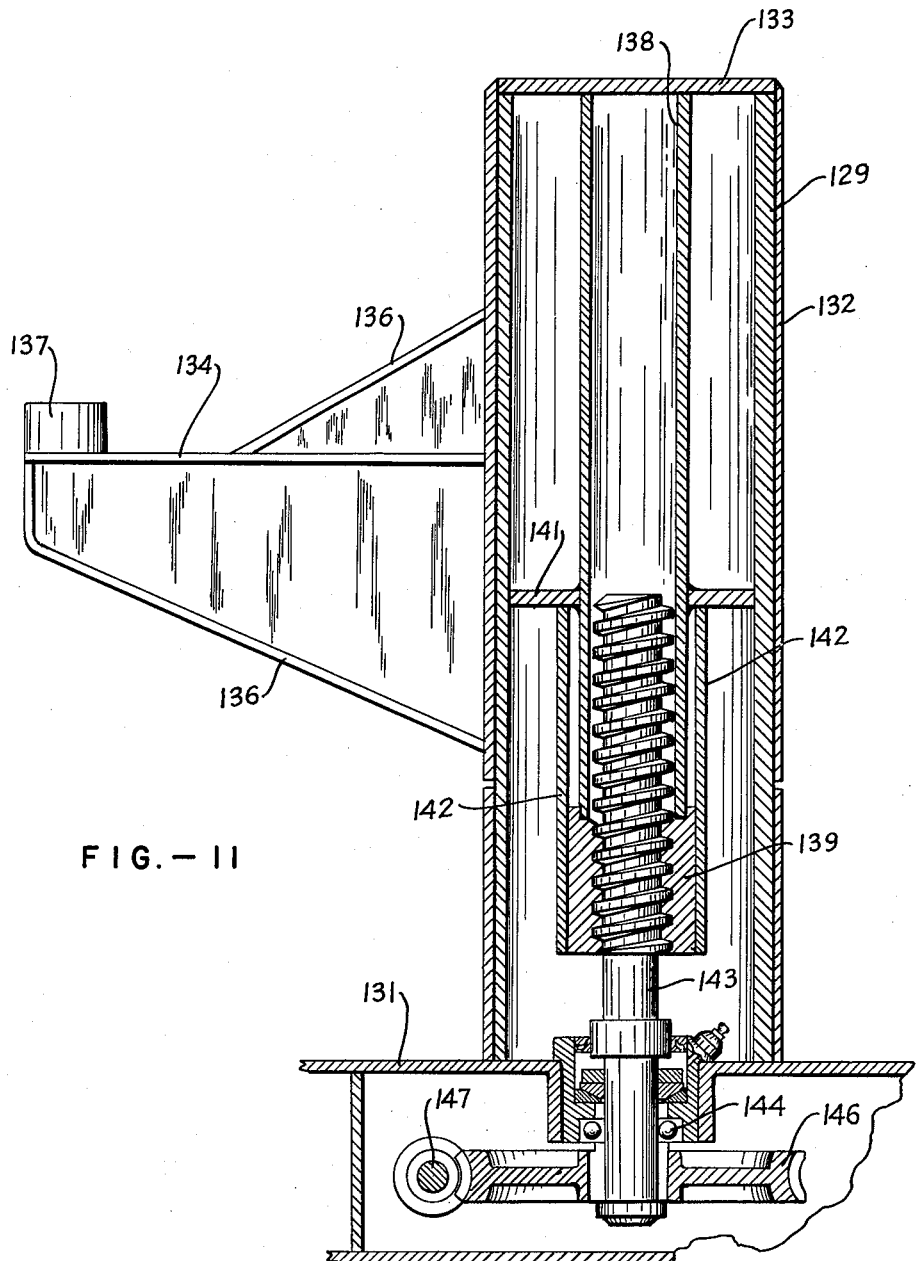

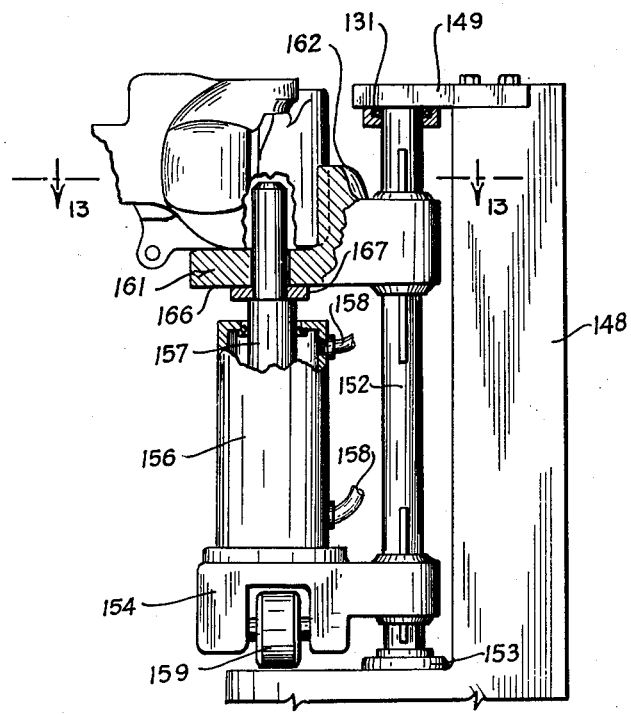
FIG. — 12
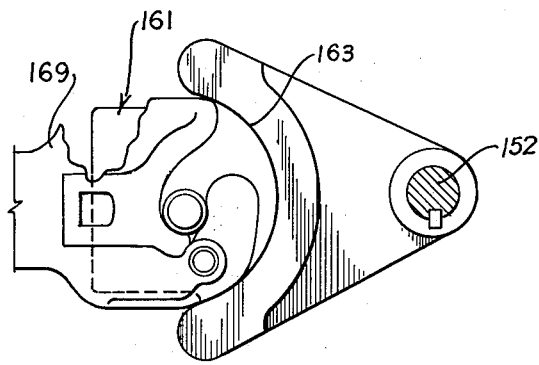
FIG.— 13

United States Patent Office 2,718,195
Patented Sept. 20, 1955

2,718,195
TRACTION VEHICLE

George E. Bock, Chicago, and Victor H. Ames, Midlothian, Ill., assignors to Whiting Corporation, Harvey, Ill., a corporation of Illinois Application May 25, 1950, Serial No. 164,226

27 Claims. (Cl. 105—90)

Our invention is directed to traction vehicles, particularly to light weight traction vehicles of the type adapted for moving railway cars along tracks in a yard or shop when a locomotive is not available.

The movement or positioning of railway cars, particularly freight cars, along spur tracks and the like, is sometimes accomplished by utilizing specially constructed hand levers by means of which workmen may inch railway cars along the tracks. If the car is to be moved any substantial distance, this type of operation obviously becomes impractical, particularly if there is a grade to the track or if the car is heavily loaded. Another well-known method of moving freight cars is to mount a winch at one end of the spur track by means of which the cars may be drawn on a cable secured to the winch to the desired position. Such installations are moderate in cost, but are quite limited in application, since in most instances the winch operates on only a single track. The most satisfactory method of positioning railway cars is to utilize a traction engine fitted with rail wheels capable of developing sufficient tractive effort to move in some instances several cars around a yard or shop. These devices, while satisfactory from a utility standpoint, are usually quite expensive, and are necessarily of very heavy construction, since they depend upon their weight to develop adequate tractive effort.

One of the principal objects of our invention is to overcome the defects inherent in the prior art devices by providing a light weight, efficient, inexpensive rail traction vehicle in which adequate traction for the movement of heavily loaded railway cars is developed by transferring a portion of the weight of the railway car to the traction vehicle at a point situated between the front and rear vehicle wheels.

Another important object of our invention is the provision of an improved coupling device for use on our traction vehicle which is effective not only for coupling the car to our vehicle, but also for transferring a portion of the load.

Further objects of our invention include the provision of a traction vehicle which is particularly shaped to eliminate interference between our vehicle and the railway car or its attachments, which may be driven on land as well as on rails, and which incorporates an improved power train.

Figure 3:
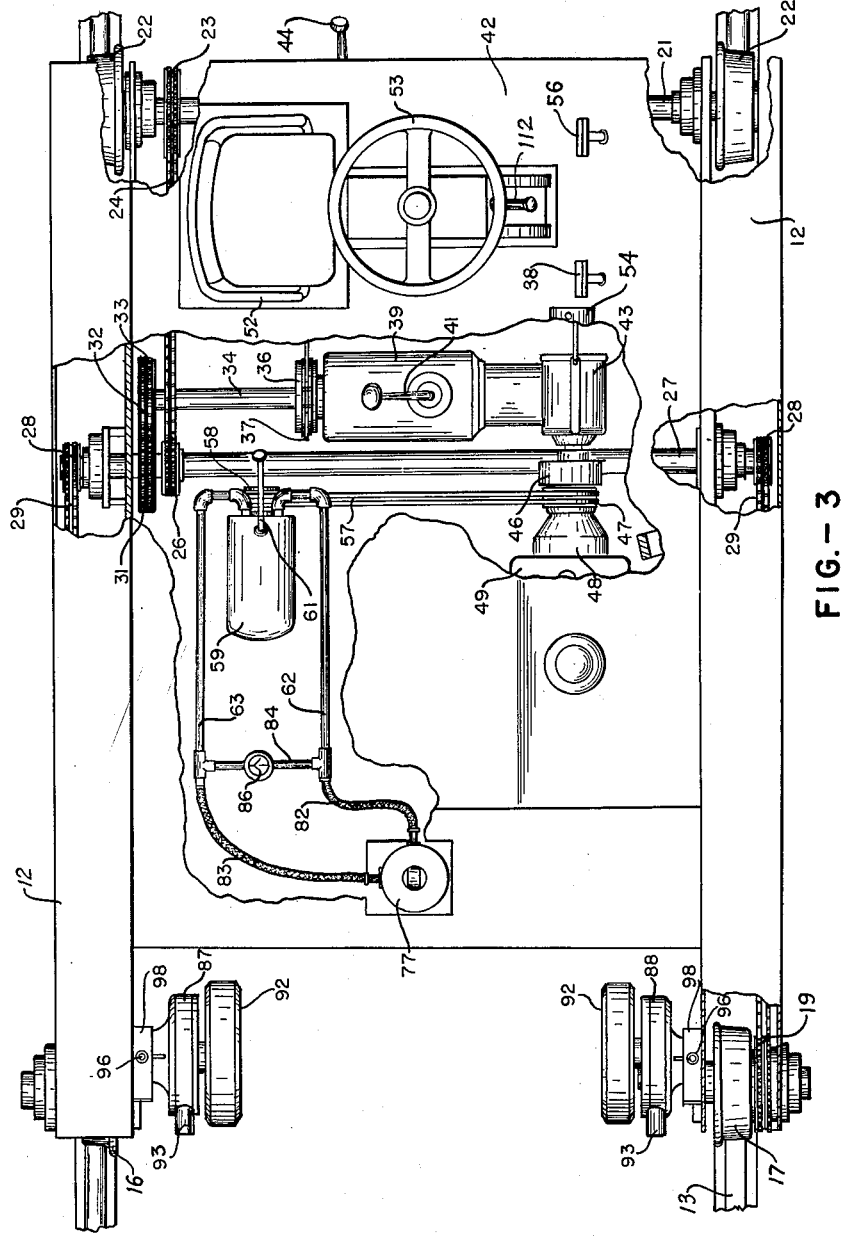

Other objects of our invention, which relate generally to novel components and assemblies and the several notable advantages thereof, will be disclosed in the following detailed description and in the appended drawings, in which:

Fig. 1 is a perspective view of our rail traction vehicle;
Fig. 2 is a partially cut away elevation of a portion of our vehicle;
Fig. 3 is a partially cut away plan view of our vehicle;
Fig. 4 is a partial elevation of the front of our vehicle;
Fig. 5 is a partially sectioned elevation indicating the relationship between the coupling device of our vehicle and a standard railway car coupler;
Fig. 6 is a partially sectioned elevation of a wheel assembly of our vehicle;
Fig. 7 is a partial cross section through a locking device for our wheel assembly;
Fig. 8 is a partially sectioned elevation of a steering wheel unit for our vehicle;
Fig. 9 is an elevation of my vehicle after engagement with a railway car coupler;
Fig. 10 is a somewhat diagrammatic perspective view of a modified form of our vehicle incorporating another type of coupling;
Fig. 11 is a partial section through the type of coupler illustrated in Fig. 10;
Fig. 12 is a partially sectioned elevation of a modified form of our coupler; and
Fig. 13 is a view taken along the line 13—13 of Fig. 12.

In brief, our vehicle includes a generally rectangular frame having longitudinal members projecting forwardly beyond the leading cross member and defining a gap into which the air hose and other accessories disposed on a railway car near the coupler may hang without contact with our vehicle when the latter is coupled to a railway car. Four rail wheels are mounted on the frame and are driven through a suitable power train by an internal combustion engine. If desired, road wheels adapted to permit movement of the vehicles along roads may be incorporated and driven from the rail wheels. When not utilized, the road wheels are retractable to raise and lower the rail wheels from the track and at least one of the road wheels is pivoted to permit steering the vehicle while along the road. The operator rides the vehicle, which is provided with suitable operating controls. Mounted on the vehicle is a rigid coupling device disposed wholly between the leading and trailing rail wheels and at an elevation suitable for engagement with a standard railway car coupler. Because the coupler is rigid, our vehicle may be utilized to either push or pull the railway car, but curves may be negotiated without difficulty because an upright pivot pin is incorporated between our vehicle and the railway car coupler to permit relative misalignment between the car and vehicle.

In addition to serving as a means for transmitting draft from the vehicle to the car, our coupling device also cooperates with a jack, which forces a member, usually integral with the vehicle coupler head, upwardly into engagement with a lower face of the head of the railway car coupling, thus transmitting a portion of the weight of the railway car to our vehicle at a point between the leading and trailing wheels. This not only permits our vehicle to develop the tractive effort necessary to move the railway car, but also distributes the weight so transmitted to all four rail wheels in such manner as to insure stability regardless of the power applied to the wheels. In addition, certain of our couplers may be operated in such manner as to automatically engage and disengage the head of a standard railway car coupler.

An embodiment of my invention is illustrated by the vehicles shown in Figs. 1 and 3, which include a frame generally designated 11, of rectangular configuration, having longitudinal channel shaped members 12 parallel to rails 13, and connected by cross members 14. The forward cross member 14 defining a gap, indicated at 15, into which the air hose or other attachments near the coupler of a railway car may hang without contact with my vehicle when the latter is engaged with the coupler. At the forward end of the longitudinal frame members 12, I provide a right front rail wheel 16 and a left front rail wheel 17 each disposed within the channel members 12 and secured to individual axles 18 journaled to the frame members 12. Sprockets 19 are secured to the axles 18 for driving the wheels. A rear axle 21 is also journaled to the longitudinal members 12 and provided with rear rail wheels 22 disposed within the channel members 12. A sprocket 23 is secured to the axle 21 and engages a chain 24 which is trained over a sprocket 26 secured to a cross shaft 27 journaled to the frame 11 approximately midway between the leading and rear rail wheels. Sprockets 28 are disposed within the channel members 12 and are fixed to the ends of the cross shaft 27. Chains 29 are trained over the sprockets 28 and the sprockets 19 for driving the front of leading rail wheels. Also fixed to the cross shaft 27 is a sprocket 31 engaging a chain 32, the latter being trained over a sprocket 33 secured to a drive shaft 34.

The drive shaft is connected to a flexible coupling 36, the external surface of which is cylindrical, and which acts as a brake drum. A conventional band brake 37 of the automotive type extends around the coupling 36 and is actuated through suitable rods and levers by a brake pedal 38. The coupling 36 is secured to the output shaft of a conventional multiple speed sliding gear type of automotive transmission 39, having for example four forward speeds and one reverse speed. This type of transmission is often employed in trucks, and is provided with a gear selector lever 41 projecting upwardly through a deck 42 secured over the frame 11. The input shaft of the transmission 39 is driven by the output shaft of a conventional reverse gear assembly 43, which incorporates a sliding gear movable within the housing to reverse the direction of rotation in response to movement of a reverse gear lever 44, which is suitably linked to the reverse gear 43. The input shaft of the reverse gear mechanism 43 is connected to a second flexible coupling 46, the external portion of which is grooved to form sheaves 47. A clutch 48, connects the coupling 46 with an engine 49, the latter preferably being of the internal combustion type.

The operating mechanism just described is disposed below the deck 42 or covered by an enclosure 51 projecting upwardly from the deck 42, the enclosure being located approximately midway between the front and rear wheels.

At the rear portion of the deck 42 I provide a drivers seat 52 mounted near a steering wheel 53. The speed of the engine 49 is controlled by a conventional accelerator 54, and the clutch 48 is controlled by a clutch pedal 56, both being disposed conveniently to the driver's seat 52. Belts 57 are trained over the sheaves 47 and engage sheaves 58, which in turn drive a hydraulic pump unit 59 of conventional design which incorporates a gear or similar pump, a fluid reservoir, and suitable control valves actuated by a lever 61, the latter being movable to force the output of the pump through either pipe 62 or pipe 63, it being understood that the hydraulic circuit driven by pump 59 is closed, and that when fluid is passing through one of the pipes 62 and 63, the other pipe discharges into the reservoir. The lever 61 projects through the housing 51 in a position easily accessible to the driver.

Within the enclosure 51 I provide a post or support 64 disposed approximately at the level of a railway car coupler and reinforced by members 66 secured to the post 64 and to the frame 11. An elongated hollow housing 67 is pivotally secured to the post 64 for movement in a generally vertical plane by a horizontal pin 68 extending through the post 64 and a bracket 69 fixed at one end of the housing 67. The housing 67 extends forwardly through the enclosure 51, terminating in an open end which is preferably disposed above the front cross member 14 of the frame 11 and to the rear of the wheels 16 and 17.

A generally vertical pin 71 extends through the housing 67 near the bracket 69 and pivotally anchors one end of a tongue 72 in such manner that the latter is movable in a generally horizontal plane within the housing 67, which is considerably greater in width than is the tongue 72. The portion of the tongue near the open end of the housing 67 is preferably supported by a bearing member 73. The end of the tongue projecting beyond the housing 67 is provided with a jaw 74 of suitable shape for engaging a standard railway car coupler. Immediately below the jaw, and preferably fixed thereto, I provide a member 76, usually in the form of a plate which is disposed in such manner as to engage the lower surface of the railway car coupler after the coupler has been engaged by the jaw 74 and the jaw raised. The tongue 72 and the jaw 74 project beyond the housing 67, but not sufficiently to extend over the center of the axles 18.

To move the housing 67 upwardly or downwardly about the pin 68, we provide a jack, preferably in the form of a double acting hydraulic cylinder 77 pivotally secured at its lower end to the front cross member 14. Within the cylinder 77 is a piston 78 coupled to a projecting piston rod 79, which is in turn pivotally connected to a bracket 81 fixed on the lower surface of the housing 67. The piston 78 is driven upwardly or downwardly by the pump unit 59 according to the position of the lever 61. A flexible hose 82 may connect the pipe 62 with the lower portion of the cylinder 77 below the piston 78, a similar hose 83 being employed to connect the pipe 63 with the upper portion of the cylinder 77. To prevent the generation of excessive pressures in the cylinder 77, we provide a pipe 84 connecting the pipes 62 and 63 and provided with a pressure loaded relief valve 86, which permits the flow of fluid from the pipe 62, which leads to the bottom of the cylinder 77, to the pipe 63 when a predetermined pressure is exceeded.

Since it is sometimes necessary to move our vehicle from one track to another between which there is no convenient cross rail connection, we provide road wheels capable of manual movement from a raised position into the lowered position in which they elevate our vehicle and the rail wheels from the rail. Although several arrangements are possible, we prefer to extend the front rail wheel axles 18 inwardly into the gap 15 and to pivotally mount thereon elongated members 87 and 88 for the right and left hand wheels respectively. Journaled in the opposite ends of the members 87 and 88 are road wheel axle 91, to which leading road wheels 92 are secured. The left hand member 88 is hollow and encloses a pair of meshing gears (not shown), one of said gears being secured to the rail wheel axle 81 and the other to the road wheel axle 91 in such manner that the road wheel 92 will be driven with the left front rail wheel 17 regardless of whether the road wheel 92 is in raised or lowered position.

Each of the members 87 and 88 includes a socket 93 in which a pipe or other suitable lever member may be inserted for moving the member about the rail wheel axles 18, thus raising and lowering the road wheels 92 into and out of contact with the ground. The distance between the road wheel axles 89 and 91 and the rail wheel axles 18 is sufficient to raise our vehicle from the rails when the members 87 and 88 are rotated to bring the road wheels 92 into contact with the ground.

To hold the road wheels 92 in raised or lowered position, we form on each of the members 87 and 88 projecting lugs 94. Pins 96 project radially outwardly from suitable openings formed in the lugs 94 and are urged outwardly by springs 97 into engagement with a plate 98 secured to the inner face of the longitudinal openings suitably positioned to hold the road wheels in raised or lowered position when engaged by the pins 96. Arms 99 are secured to the pins 96 and project laterally through the lugs 94 for disengaging the pin 96 from the opening in the plate 98 when desired.

The rear of our vehicle is provided with a single road wheel 101 journaled to a fork 102, which is connected to a shaft 103 secured to the steering wheel 53. The shaft 103 is rotatably mounted in a housing 104, the latter being concealed by a suitable cover 106 having an arcuate front portion 107. The housing 104 is connected to a frame 11 by a pair of parallel links 108 and 109, each pivoted at each end to the frame 11 and to the housing 104. One of the links 108 extends outwardly beyond the cover 104 forming a yoke 111 in which a lever arm 112 is reciprocally mounted. The lower end of the lever 112 extends through the yoke into engagement with suitable openings, indicated at 113 formed in the front portion 107 of the cover 106 in such manner that the wheel 101 may be moved upwardly and downwardly by movement of the lever 112 and locked in position by engaging the lever in one of the openings 113.

In operation, the driver runs our vehicle forwardly until the jaw 74 is engaged with a coupler 114 of a railway car 116, the vertical position of the jaw 74 being adjusted by movement of the piston rod 79, which is in turn controlled by the lever 61. When in this position it will be noted that the air hose 117 of the car 116 hangs downwardly into the gap 15 and does not contact our vehicle. The operator then moves the lever 61 in a direction which causes the pump 59 to force fluid into the lower portion of the cylinder 77, thus driving the housing 67 upwardly. Since the housing 67 supports the tongue 72 through the bearing 73, it may be seen that the member 76 will be brought into contact with the lower face of the coupler 114, and that a portion of the weight of the car 116 will thus be transferred to our vehicle at a point between the leading and trailing rail wheels. The valve 86 limits the total weight which may thus be transferred and so avoids overloading our vehicle. The operator may then by suitable adjustment of the gear levers 44 and 41 move the car 116 and our vehicle forwardly or rearwardly as desired, the necessary traction being developed by the above-described transfer of weight.

In equalities in the height of the rails 13 are automatically compensated by the valve 86, which permits the discharge of fluid from below the piston 78 in instances where the car 116 moves downwardly. Since the pump 59 may operate continuously, pressure may be maintained in the cylinder 77 if our vehicle should drop relative to the position of the car 116. The negotiation of curves presents little difficulty, since the tongue 72 is free to move in a substantially horizontal plane without requiring movement of the housing 67 or of the piston 79. When the car has reached the desired position, coupler 114 may be disengaged from the jaw 74 and the vehicle moved to its next task.

As is customary in most automotive transmissions, the reverse gear ratio of the transmission 39 is quite low. When extremely heavy loads are encountered, a very low gear ratio may therefore be obtained by shifting the transmission 39 into reverse and actuating the reverse gear mechanism 41, which reverses the direction of movement of the transmission input shaft. It may be seen that our vehicle may be moved in either direction with equal ease by proper utilization of the reverse gear 43.

If it is necessary to move our vehicle from one track to another, the pins 96 holding each of the front road wheels in position may be disengaged and a lever inserted in the sockets 93 lowering the leading road wheels 92 until the pins 96 engage the proper opening in the plates 98, which raises the front end of our vehicle from the rails. The lever 112 is then moved downwardly and engaged in its catch, thus lowering the wheel 101 into contact with the ground and raising the rear end of the vehicle. In this position our vehicle may be driven as a conventional truck, since the power is transmitted through the rail wheel 17 to the left front road wheel 92. It will be understood that while operating on its road wheels, all of the rail wheels will also be driven. Steering is effected by suitable movement of the steering wheel 53. When the vehicle is again in position on the desired track the road wheels may be retracted by reverse operation.

The vehicle and coupling device hereinbefore described in detail is highly satisfactory in most respects and is relatively inexpensive. In some instances, however, it is desirable to provide a vehicle having a coupler which can be engaged with the coupler of a railway car either to the front or rear of our vehicle. This, of course, may be accomplished in the type of vehicle illustrated in Figs. 1–9, inclusive by providing another coupler extending rearwardly from the post 64 and provided either with a separate jack or linked to the jack 77 by suitable mechanism.

Alternatively, we may provide a vehicle of the type shown somewhat diagrammatically in Fig. 10, which differs from the type previously described principally in that both the leading and trailing rail wheels are journaled to the frame by stub axles, the driver's seat is disposed to the side of the vehicle rather than at the rear, and the coupling device is of modified design. For example, as shown in Fig. 10, our modified form of vehicle may include longitudinal frame members 118 connected by cross members 119 disposed inwardly from the ends of the members 118. Rail wheels 121 are journaled near the ends of the frame members 118 on axles also provided with sprocket wheels 122, which are driven in a manner similar to that previously described by an engine disposed beneath a housing 123 supported by the cross members 119. A platform 124 having an operator's seat 126 is secured to one of the longitudinal members 118 and extends laterally therefrom in such manner as to support the operator in a position where he can view a series of cars disposed along a track ahead or behind the vehicle. Suitable operating controls 127, also similar to those previously described, are disposed on the platform 124 for convenient access by the operator.

Our coupling device, generally designated 128, is shown in greater detail in Fig. 11 and includes a sturdy cylindrical member 129 extending upwardly through the housing 123 and supported by a suitable member 131, which is in turn fixed to the vehicle frame. Telescoped over the cylindrical member 129 is an elongated cup 132 having a top 133 which in its lowest position engages the upper end of the cylindrical member 129. A flat arm 134 extends laterally from the side of the cup 132 and is suitably reinforced by angularly disposed upper and lower reinforcing members 136. A pin 137 extends upwardly from the arm 134 near its supported end and is disposed to extend into the opening of a standard railway car coupler when the device is in operation. Extending downwardly from the top 133 is a tubular member 138 disposed within the cylindrical member 129 and engaging a nut 139. Guide members 141 extend laterally from the tube 138 into engagement with the inner walls of the cylindrical member 129. The nut 139 is preferably square and engages plates 142 extending transversely within the cylinder 139 and secured thereto. A jack screw 143 threadedly engages the nut 139 and projects upwardly into the tubular member 138. The screw 143 is journaled as by bearings 144 in the support 131 and is driven by a worm gear 146 secured to its lower end. A worm 147 engages the gear 146 and may be suitably clutched to a power takeoff on the internal combustion engine in a manner similar to that previously described in connection with the operation of the pump 59.

In operation, the vehicle is moved into position with the pin 137 immediately below the opening in a standard railway car coupler head, which must be closed. The jack is elevated by operation of the worm 147 forcing the pin 137 upwardly and bringing the arm 134 into engagement with the lower face of the railway car coupler head. A portion of the weight of the railway car is thereby transmitted to our vehicle, permitting it to develop adequate tractive effort for movement of the car. The total amount of weight transmitted from the car to the vehicle may be left to the judgment of the operator or limited by the use of a torque-limiting clutch of conventional design disposed between the worm 147 and the engine. Since the arm 134 and the pin 137 can be moved without appreciable effort through 360°, it is obvious that this type of vehicle can be utilized in the movement of railway cars either ahead or behind the vehicle on a track. Furthermore, since the arm 134 may swing freely around the cylindrical member 129, no difficulty will be encountered in moving the car around curves. Obviously, if desired, a hydraulic similar to that previously descibed may be substituted for the screw 143.

Other forms of coupling devices may be employed and are particularly adapted for use in connection with the type of vehicle first described. For example, as shown in Fig. 12, we may provide a post or upright support 148 for connection directly to the frame members of a vehicle, such as that illustrated in Fig. 2, the posts 148 being disposed in a position approximating that of the post 64. An arm 149 is secured to the top of the post 148 and projects outwardly beyond the forward edge of the post to support a bearing 131, in which one end of a shaft 152 is journaled. The lower end of the shaft 152 is journaled in a suitable bearing 153 supported either by an extension of the arm 148 or by the frame of the vehicle. Sliding vertically along the lower portion of the shaft 152 is an arm 154 which supports a hydraulic or pneumatic jack 156 having an upwardly extending piston rod 157. The jack 156 is rigidly secured to the outer end of the arm 154 and is supplied with fluid through suitable flexible hose connections 158. The wheel 159 is journaled in the arm 154 engaging the frame of the vehicle to support a major portion of the load transmitted by the jack 156. An upper arm 161 slidably engages the upper end of the shaft 152 and projects outwardly therefrom over the jack 156 and the piston rod 157. The arm 161 includes an upper portion 162, which defines a curved cavity, indicated at 163, for engagement with the head of a standard railway car coupler, indicated at 169. The lower portion of the arm 161 includes laterally projecting flat portions 166 for disposition beneath the head 169 of the car coupler and defines an opening through which the piston rod 157 projects. A collar 167 is fixed on the piston rod and transmits the upward thrust of the jack to the arm 161, thus bringing the flat portion 166 of the arm into engagement with the lower face of the railway car coupler 164. To prevent misalignment both the upper arm 161 and the lower arm 154 should be connected to the shaft 152. Since the curved cavity defined by the upper portion 162 of the arm 161 is shaped in such manner as to force a standard railway coupler into closed position by engagement with the coupler knuckle, it is unnecessary for the operator to dismount in order to couple on to a car having an open coupling. In most instances it will also be possible for the operator to disengage the car by forcing the piston rod 157 downwardly a distance sufficient to disengage the piston rod and the arm 161 from the car coupler. If this form of operation is desired, the collar 167 should be attached to the arm 161 and to the piston rod 157.

From the foregoing it may be seen that our vehicle is of simple construction and light in weight, which permits fabrication at a remarkably low cost. Utility however, has not been sacrificed, since adequate traction is gained by transferring a part of the weight of the object being moved to our vehicle. Maneuverability is retained through the unique coupling device we employ, and any tendency towards tipping or slippage of the wheels within the tractive limits of our device is eliminated by positioning the load between the leading and trailing rail wheels. Overloading of our vehicle is prevented by the relief valve 86 or by a torque-limiting device, but the pressure necessary to maintain traction is maintained at all times by the continuously operating pump unit 59. Thus our vehicle is enabled to perform substantially every operation now performed by much heavier and more expensive traction type locomotives currently in use, but at a far lower cost.

It is of course not essential that the precise details of construction hereinbefore described be utilized in fabricating our vehicle to obtain these advantages. For example, jacks other than a double acting hydraulic cylinder may be employed, as for example a pneumatic cylinder or a mechanical jack. The precise form of connection employed in securing the tongue 72 to the post 64 may be varied, but we prefer to retain in any modifier form the universal joint type of connection which permits movement of the assembly both horizontally and vertically. The engine need not be of the internal combustion type, since other devices such as an electric motor driven by storage batteries may be utilized without major modification, although if the latter form of construction is employed the transmission mechanism may be simplified considerably. If the road wheels are to be used frequently, power actuated means may be applied for raising and lowering the wheels as for example by suitable fluid cylinders. In view of these and other obvious modifications, we do not therefore wish to confine ourselves to the exact details hereinbefore described except insofar as defined in the appended claims.

We claim:

1. A coupler device for use with a lightweight rail traction vehicle having a fixed post mounted thereon comprising a rigid tongue, a universal joint connecting one end of the tongue with the post, a jaw on the other end of the tongue for engagement with a railway car coupler, a member below the jaw and rigid with the tongue for upward movement into engagement with a lower face of the car coupler, a bearing below the tongue, and means engaging said bearing and traction vehicle for forcing said member upwardly into engagement with the lower surface of the railway car coupler whereby a portion of the weight of the railway car is transferred to the vehicle.

2. A coupler device for use with a lightweight rail traction vehicle having a fixed post thereon comprising a housing secured to the post for movement in a generally vertical plane only, a tongue pivotally secured at one end to the housing for movement in a generally horizontal plane, a jaw on the other end of the tongue adapted for engagement with the railway car coupler, a member movable with a jaw and tongue and disposed below the jaw for engagement with a lower face of a railway car coupler and a jack carried by the vehicle engaging the housing for forcing the housing, tongue, jaw, and said member upwardly.

3. A coupler device for use with a lightweight rail traction vehicle having a fixed post thereon comprising a housing secured to the post for movement in a generally vertical plane only, a tongue pivotally secured at one end to the housing for movement in a generally horizontal plane, a jaw on the other end of the tongue adapted for engagement with the railway car coupler, a member movable with the jaw and tongue and disposed below the jaw for engagement with a lower face of a railway car coupler, and jacking means pivotally secured at one end to the vehicle and at the other end to a housing for forcing the housing together with the tongue and said member upwardly.

4. A coupler device for use with a rail traction vehicle having a fixed post thereon comprising a housing secured to the post for movement in a generally vertical plane only, a tongue pivotally secured at one end to the housing for movement in a generally horizontal plane, a jaw on the other end of the tongue adapted for engagement with the railway car coupler, bearing means between the tongue and the housing, a member movable with the jaw and tongue and disposed below the jaw for engagement with a lower face of a railway car coupler, and jacking means pivotally secured at one end to the vehicle and at the other end to the housing for forcing the housing together with the tongue and said member upwardly.

5. A rail traction vehicle of the type adapted for moving a railway car having a coupler along a track comprising a frame, leading and trailing rail wheels journaled on the frame, means for driving the wheels, a coupling device pivotally secured to the frame for movement in a generally horizontal direction for pivotal locking engagement with a railway car coupler, said coupling device including a portion disposed for engagement with a lower face of the railway car coupler, and jacking means on the vehicle for forcing said portion upwardly, said portion being disposed on the vehicle between the leading and trailing wheels, said railway car coupler being the sole stress transmitting connection between the car and vehicle.

6. A rail traction vehicle of the type adapted for moving railway cars having couplers comprising a frame having longitudinal members and cross members, said longitudinal members projecting forwardly beyond the cross members and defining a gap, independent leading rail wheels journaled to the forward ends of the longitudinal members, trailing rail wheels journaled to the longitudinal members, means for driving the wheels, a rigid, elongated, generally horizontal coupling device for engagement with the railway car coupler pivotally secured to the frame and disposed between the leading and trailing wheels, said coupling device including a member movable upwardly into engagement with the lower face of the railway car coupler, and jacking means carried by the frame between the leading and trailing wheels for forcing said member upwardly.

7. A rail traction vehicle of the type adapted for moving railway cars having couplers comprising a frame having longitudinal members and cross members, said longitudinal members projecting forwardly beyond the cross members and defining a gap, independent leading rail wheels journaled to the forward ends of the longitudinal members, trailing rail wheels journaled to the longitudinal members, means for driving the wheels, a post on the frame between the leading and trailing wheels, a housing pivoted to the post for movement in a generally vertical direction, a tongue in the housing pivotally secured thereto at one end for movement in a generally horizontal direction, a bearing member disposed between the housing and the tongue, a jaw on the other end of the tongue for engaging the coupler of a railway car, said jaw also being disposed between the leading and trailing rail wheels of the vehicle and near said gap between the leading wheels, a member below the jaw and fixed with respect to the jaw for engagement with a lower face of the railway car coupler, and a fluid cylinder and piston unit pivotally secured to the frame at one end and to the housing at its opposite end for forcing said member upwardly.

8. A rail traction vehicle comprising leading and trailing rail wheels on the frame, means for driving all of said rail wheels, and a laterally extending rigid coupling device pivotally secured to the frame, said device including a jaw and member movable upwardly into engagement with a lower face of a coupler jaw and a railway car coupler, and disposed between the leading and trailing rail wheels, a double acting hydraulic piston and cylinder member for moving one end of the coupling device and member up and down, a pump for forcing liquid to either end of the cylinder, and means for limiting the liquid pressure acting to raise said coupling device.

9. A traction vehicle for moving railway cars having couplers comprising a frame, front and rear rail wheels on the frame, means for driving the wheels, a rigid coupling device pivotally secured to the frame and disposed between the front and rear wheels for engagement with a railway car coupler, said device including a member movable upwardly into engagement with a lower face of the railway car coupler, a hydraulic piston and cylinder unit on the frame for forcing the member upwardly, pump means for supplying liquid under pressure to the cylinder, and a relief valve for limiting the pressure in the cylinder.

10. A lightweight rail traction vehicle comprising a frame having longitudinal members, leading and trailing rail wheels journaled to the end portions of the longitudinal members, means on the vehicle for driving the wheels, an upright support on the frame, a rigid coupler pivoted to the support for movement in a generally horizontal plane between the leading and trailing wheels, said coupler including a first member disposed for draft engagement with a standard railway car coupler, and a second member below the first member disposed for upward movement into engagement with the lower surface of the car coupler and means on the vehicle for forcing the second member upwardly.

11. A coupling device for use on a lightweight rail traction vehicle of the type having a frame, leading and trailing rail wheels journaled to the frame and an engine for driving the wheels comprising an upright post secured to the frame, an upright shaft pivotally supported by the post, a lower arm secured to the post and projecting laterally therefrom, an upper arm slidably secured to the post and having a generally upright face for engagement with an end of a standard railway car coupler and generally horizontal face below the upright face for engagement with the lower surface of the car coupler, an upright jack carried by the lower arm and engaging the upper arm, and means on the vehicle for elevating the jack.

12. Apparatus for coupling a rail traction vehicle to a railway car having a car coupler comprising a rigid vehicle coupler device on the vehicle for transmitting tensional and compressive stress between the vehicle and the car coupler and including a vehicle coupler head for locking draft and lifting engagement with the car coupler, said vehicle coupler device when coupled to the car defining not less than two relatively movable points of connection between the car and vehicle, one of said points being movable in a generally horizontal plane only, and the other of said points being disposed between the first mentioned point and the traction vehicle, said coupler device also including means for forcing said first mentioned point and the car coupler upwardly whereby a portion of the weight of the car is transferred to the vehicle through the coupler device.

13. A lightweight rail traction vehicle adapted for pushing and pulling railway cars along shop or yard tracks, each of said railway cars having a standard railway car coupler which includes a tongue pivotally secured near one end to the car for movement in a generally horizontal plane, each car coupler also including a car coupler head on the opposite end of said tongue, said traction vehicle comprising a frame, leading and trailing pairs of rail wheels journaled on the frame, means carried by the frame for driving at least one of the rail wheels, a rigid vehicle coupler connected to the frame and having a vehicle coupler head for pivotal draft engagement with the head of the railway car coupler, a member on the vehicle movable upwardly into engagement with said railway car coupler when said vehicle and car couplers are engaged, said member being disposed wholly between the leading and trailing pairs of rail wheels, jack means on the vehicle for forcing said member upwardly, and pivot means disposed between the car coupler head and the vehicle frame, said car coupler constituting the sole stress transmitting connection between the car and the vehicle.

14. A lightweight rail traction vehicle of the type adapted for pushing and pulling railway cars along shop or yard tracks, each of said railway cars having a standard railway car coupler which includes a tongue pivotally secured near one end to the car for movement in a generally horizontal plane only, each car coupler also including a car coupler head on the opposite end of said tongue, said vehicle comprising a frame, leading and trailing wheels journaled on the frame, means including an engine for driving at least two of the rail wheels, a rigid vehicle coupler secured to the vehicle frame wholly between the leading and trailing rail wheels for draft engagement with the head of a railway car coupler, a member on the vehicle movable upwardly into engagement with the car coupler when the couplers are engaged, jack means on the vehicle for forcing said member upwardly, means including said engine for actuating the jack means and pivot means disposed between the car coupler head and the vehicle frame for transmitting draft from the vehicle to the car, said car coupler constituting the sole stress transmitting connection between the car and the vehicle.

15. A lightweight rail traction vehicle of the type adapted for moving a railway car having a car coupler tongue pivoted at one end to the car for movement in a generally horizontal plane only, and a car coupler head on the opposite end of said tongue projecting outwardly for engagement with a mating coupler, said vehicle comprising a frame, leading and trailing pairs of rail wheels journaled on the frame, an engine on the frame for driving at least one of said pairs of rail wheels, a rigid vehicle coupler pivoted to the frame and disposed for locking pivotal engagement with said railway car coupler head, a member on the vehicle having an upper face disposed for engagement with a lower face of the railway car coupler when said couplers are locked together, jack means on the vehicle coupled to said member for forcing said member upwardly into engagement with the railway car coupler, said jack means and vehicle coupler being so disposed and arranged as to transmit the downward stress developed on said member to said frame at a point between the leading and trailing pairs of rail wheels and power means on the vehicle for actuating the jack means.

16. A rail traction vehicle for pushing and pulling a railway car of the type having a railway car coupler movable in a generally horizontal plane, said vehicle comprising a frame, leading and trailing pairs of rail wheels journaled on the frame, means for driving said wheels, a vehicle coupler including a rigid tongue pivoted near one end to the frame and disposed wholly between said pairs of rail wheels, means on the opposite end of the tongue for pivotal draft engagement with said car coupler head, said means including a member disposed for engagement with a lower surface of the car coupler when the vehicle coupler and car coupler are engaged and the vehicle coupler is raised, and jack means on the vehicle for forcing said member upwardly whereby a portion of the weight of the railway car is transferred to the vehicle at a point between said leading and trailing pairs of rail wheels, said coupler device being the sole transmitting connection between the railway car and the vehicle.

17. Apparatus for coupling a rail traction vehicle to a railway car comprising a rigid member having means near one end defining a first pivot point for attachment of the member to the vehicle and means spaced horizontally from the first mentioned means defining a second pivot point and car support for coupling the rigid member to the railway car, and jack means on the vehicle for forcing said second pivot point and the railway car upwardly.

18. Apparatus for connecting a rail traction vehicle to a railway car of the type having the car coupler terminating in an automatic car coupler head restrained from free vertical movement with respect to the rail car, said apparatus comprising a rail vehicle coupler head for lifting and locking draft engagement with the car coupler head and defining therewith a joint having an upright axis about which the vehicle coupler head may move, a rigid, generally horizontal tongue on the vehicle coupler head including means for pivotally connecting said tongue to the traction vehicle, said tongue being adapted for transmitting both tensional and compressive stress between the car and the vehicle, and means movable with the vehicle coupler head for forcing the car coupler head upwardly whereby a portion of the weight of the railway car is transferred to the vehicle through the coupler device.

19. Apparatus for coupling a rail traction vehicle to a railway car of the type having a standard laterally movable automatic car coupler head projecting from the railway car comprising a vehicle coupler having a tongue portion for transmitting both tensional and compressive stresses between the traction vehicle and the railway car, means for securing one portion of said tongue portion to the traction vehicle for movement about a generally horizontal axis, means on a second horizontally spaced portion of the tongue portion for pivotal draft engagement with the coupler head of the railway car, a transversely extending member below said second portion for engagement with a lower surface of the railway car coupler when the car coupler and said second portion are engaged, and jack means for forcing said member upwardly.

20. A coupler device for use with rail traction vehicles comprising a jaw shaped for draft engagement with a standard automatic railway car coupler, a rigid member below the jaw and movable therewith for engagement with the railway car coupler when said jaw is raised after coupling whereby a portion of the weight of the railway car is carried by said member, and said device simultaneously transmits both draft and lifting forces, and means for forcing said right member upwardly.

21. A coupler device for coupling a rail traction vehicle to a railway car having a car coupler comprising a head having a jaw for draft engagement with a standard railway car coupler and a member fixed to the head below the jaw engageable upon upward movement with a lower face of said railway car coupler whereby said member supports a portion of the weight of the railway car secured to said railway car coupler, and means for forcing said member upwardly.

22. Apparatus for coupling a rail traction vehicle to a railway car having a railway car coupler restrained from vertical movement comprising a rigid vehicle coupler device on the vehicle for transmitting tensional and compressive stress between the vehicle and the railway car coupler and including a vehicle coupler head for locking draft engagement with the railway car coupler, said vehicle coupler device when coupled to the railway car coupler defining not less than two relatively movable points of connection between the railway car and the vehicle, one of said points being movable in a generally horizontal plane, and the other of said points being disposed between the first mentioned point and the traction vehicle, said vehicle coupler device also including means for forcing said first mentioned point and the railway car coupler upwardly whereby a portion of the weight of the railway car is transferred to the rail traction vehicle through said vehicle coupler device.

23. In a vehicle for moving railway cars having railway car couplers along a track, said vehicle having a frame adapted for receiving and supporting a portion of the weight of the railway car and spaced pairs of front and rear rail wheels on the frame, the combination therewith of a lever arm adapted for transmitting longitudinal tensional and compressive forces, means securing the lever arm to the vehicle frame for movement about a generally upright axis, a vehicle coupler head on the lever for engagement with the railway car coupler, and means movable with the vehicle for forcing said railway car coupler upwardly after engagement of the railway car coupler and the vehicle coupler head, said vehicle coupler head and last mentioned means being disposed between said front and rear pairs of said rail wheels.

24. In a vehicle for moving railway cars having railway car couplers along a track, said vehicle having a frame adapted for receiving and supporting a portion of the mass of a railway car and spaced pairs of front and rear rail wheels on the frame, the combination therewith of a rigid lever, a first member pivotally securing said lever to the vehicle frame for movement about a generally upright axis, a vehicle coupler head on the lever for draft engagement with the railway car coupler, a second member below the coupler head and fixed with respect therewith for engagement with a lower surface of the railway car coupler when the vehicle coupler is raised, and jack means for forcing said second member upwardly, said vehicle coupler head being disposed between said front and rear pairs of rail wheels and transmitting both longitudinal draft and lifting forces to the vehicle.

25. A coupler for pivotal attachment to a rail vehicle of the type adapted to move railway cars having railway car couplers along a track comprising a draft assembly having a rigid tongue portion and a head portion on the tongue portion, said head portion being shaped for draft engagement with the railway car coupler and a rigid member secured to the draft assembly and having a portion disposed below said head portion and engageable with the lower surface of the railway car coupler when moved upwardly after engagement of said head portion and the railway car coupler, and means for forcing said rigid member upwardly.

26. A lightweight rail traction vehicle for pushing and pulling railway cars comprising a frame, leading and trailing sets of rail wheels journaled on the frame, means on the the vehicle driving one of the sets of rail wheels, a rigid vehicle coupler having a vehicle coupler head near one end adapted for draft and lifting engagement with a portion of one of said railway cars and allowing pivotal movement between said vehicle coupler head and said portion of said railway car after engagement, means pivotally securing the rigid vehicle coupler to the vehicle frame and disposed for permitting lateral movement of said vehicle coupler head with respect to the vehicle when said vehicle coupler head is in engagement with said car, and jack means on the vehicle for transferring a portion of the weight of said car to said vehicle, said rigid vehicle coupler being the sole stress transmitting system between said car and the traction vehicle.

27. Apparatus adapted for mounting on a rail traction vehicle for engagement with a car coupler on a railway car of the type having a car coupler head projecing beyond an end of the car and movable only in a generally horizontal plane, said apparatus comprising a rigid vehicle coupler having near one end a member for pivotal draft and lifting engagement with the car coupler, and means near the opposite end of the vehicle coupler for pivotal engagement with the traction vehicle, and jack means on the vehicle for forcing said member upwardly against the car coupler, said rigid vehicle coupler defining a rigid link pivoted at each end to the railway car and traction vehicle respectively and permitting displacement of the vehicle with respect to the car coupler laterally to the direction of movement whereby said traction vehicle may support a portion of the weight of said railway car while negotiating sections of curved track.

References Cited in the file of this patent

UNITED STATES PATENTS

| | | |
|---|---|---|
| 553,340 | Heidelberg | Jan. 21, 1896 |
| 595,383 | Galbraith | Dec. 14, 1897 |
| 655,055 | Butcher | July 31, 1900 |
| 1,342,761 | Richardson | June 8, 1920 |
| 2,057,230 | Callison | Oct. 13, 1936 |
| 2,164,703 | Elsey | July 4, 1939 |
| 2,292,303 | Stolz | Aug. 4, 1942 |
| 2,487,572 | McKee | Nov. 8, 1949 |

FOREIGN PATENTS

| | | |
|---|---|---|
| 70,229 | Switzerland | Jan. 22, 1914 |
| 627,241 | Germany | Mar. 11, 1936 |